US011931303B1

(12) United States Patent
Ludovici et al.

(10) Patent No.: US 11,931,303 B1
(45) Date of Patent: Mar. 19, 2024

(54) FOLDABLE TILTABLE WHEELCHAIR AND FRAME THEREFOR

(71) Applicant: Ki Mobility LLC, Stevens Point, WI (US)

(72) Inventors: Alan Ludovici, Stevens Point, WI (US); Thomas J. Whelan, Stevens Point, WI (US); Richard E. Schneider, Russell Springs, KY (US); Murray G. Slagerman, Rosser (CA)

(73) Assignee: Ki Mobility LLC, Stevens Point, WI (US)

( * ) Notice: Subject to any disclaimer, the term of this patent is extended or adjusted under 35 U.S.C. 154(b) by 220 days.

(21) Appl. No.: 17/087,873

(22) Filed: Nov. 3, 2020

Related U.S. Application Data

(63) Continuation of application No. 15/644,472, filed on Jul. 7, 2017, now Pat. No. 10,828,213.

(51) Int. Cl.
*A61G 5/10* (2006.01)

(52) U.S. Cl.
CPC ......... *A61G 5/1075* (2013.01); *A61G 5/1081* (2016.11)

(58) Field of Classification Search
CPC ...... A61G 5/1075; A61G 5/1081; A61G 5/00; A61G 5/10; A61G 5/08; A61G 5/0816; A61G 5/0825; A61G 5/1054; A61G 5/0858; A61G 5/107; A61G 5/085
See application file for complete search history.

(56) References Cited

U.S. PATENT DOCUMENTS

| | | | | |
|---|---|---|---|---|
| 1,006,476 A | | 10/1911 | Grinewezki | |
| 2,379,566 A | * | 7/1945 | Duke .................. | A61G 5/0825 297/45 |
| 2,485,016 A | * | 10/1949 | Rideout ................. | A61G 5/128 297/45 |
| 2,859,800 A | * | 11/1958 | Jennings, Jr. ........ | A61G 5/0825 248/436 |

(Continued)

OTHER PUBLICATIONS

Mobility Plus, MP Tilt Chair, Date Unknown.
Promedicare, Adacta Liga Brochure, May 2012.

*Primary Examiner* — James M Dolak
(74) *Attorney, Agent, or Firm* — Thedford I. Hitaffer; Hitaffer & Hitaffer, PLLC

(57) ABSTRACT

A foldable tiltable wheelchair that overcomes the foregoing deficiencies comprises a base frame comprising laterally spaced side frames. A tiltable seat frame is supported for pivotal movement in relation to the base frame. The tiltable seat frame comprises laterally spaced seat rails. A first foldable cross-member provides a rigid connection between the seat rails when in an unfolded position. According to one embodiment, a second foldable cross-member provides a rigid connection between the side frames when in an unfolded position. The first and second foldable cross-members coupled so that moving one cross-member moves the other cross-member. According to another embodiment, the tiltable seat frame comprises a seat back supported in relation to the seat frame. The seat back comprises laterally spaced back canes. The first foldable cross-member is coupled to the seat frame so that the back canes are supported in relation to the first foldable cross-member so as to limit lateral flexure of the back canes. The first foldable cross-member is foldable to a folded position to fold the wheelchair.

25 Claims, 8 Drawing Sheets

(56) References Cited

U.S. PATENT DOCUMENTS

| | | | | |
|---|---|---|---|---|
| 4,477,098 | A | 10/1984 | Minnebraker | |
| 4,741,547 | A * | 5/1988 | Tholkes | A61G 5/128 280/250.1 |
| 5,020,816 | A | 6/1991 | Mulholland | |
| 5,076,390 | A | 12/1991 | Haskins | |
| 5,076,602 | A | 12/1991 | Robertson et al. | |
| 5,154,438 | A | 10/1992 | Barclay | |
| 5,421,598 | A | 6/1995 | Robertson et al. | |
| 5,727,802 | A | 3/1998 | Garven, Jr. et al. | |
| 5,782,483 | A | 7/1998 | Rogers et al. | |
| 5,957,474 | A | 9/1999 | Mundy et al. | |
| 6,352,275 | B1 * | 3/2002 | Lindenkamp | A61G 5/1054 280/47.4 |
| 6,447,064 | B1 | 9/2002 | Mundy et al. | |
| 6,572,133 | B1 * | 6/2003 | Stevens | A61G 5/08 297/42 |
| 6,705,629 | B2 | 3/2004 | Post et al. | |
| 6,834,871 | B2 | 12/2004 | Chen et al. | |
| 6,938,911 | B1 | 9/2005 | Shyu et al. | |
| 7,243,935 | B2 | 7/2007 | Beumer | |
| 7,717,210 | B2 | 5/2010 | Mahy et al. | |
| 7,784,815 | B2 | 8/2010 | Porcheron | |
| 7,845,665 | B2 | 12/2010 | Borisoff | |
| 7,871,094 | B2 | 1/2011 | Balcom et al. | |
| 7,988,171 | B2 | 8/2011 | Chong | |
| 8,132,823 | B2 | 3/2012 | Balcom et al. | |
| 8,256,785 | B2 | 9/2012 | Knopf | |
| 8,336,898 | B2 | 12/2012 | Balcom et al. | |
| 8,419,047 | B2 | 4/2013 | Chen | |
| 8,424,896 | B2 * | 4/2013 | Balcom | A61G 5/1005 280/250.1 |
| 8,454,048 | B1 | 6/2013 | Regan et al. | |
| 8,511,699 | B2 | 8/2013 | Balcom et al. | |
| 8,579,315 | B2 | 11/2013 | Balcom et al. | |
| 9,358,164 | B2 | 6/2016 | Brenner et al. | |
| 9,375,370 | B2 | 6/2016 | Horacek | |
| 9,408,763 | B2 | 8/2016 | Purdue et al. | |
| 9,603,762 | B2 | 3/2017 | Bekoscke et al. | |
| 9,629,763 | B2 | 4/2017 | Thompson | |
| 9,642,756 | B2 | 5/2017 | Lauret et al. | |
| 9,829,032 | B2 | 11/2017 | Hermes | |
| 10,052,245 | B2 | 8/2018 | He et al. | |
| 10,123,922 | B2 | 11/2018 | Gingras et al. | |
| 10,188,565 | B2 | 1/2019 | Ferniany et al. | |
| 10,238,556 | B1 | 3/2019 | Slagerman et al. | |
| 10,265,229 | B2 | 4/2019 | Bekoscke et al. | |
| 10,314,751 | B2 | 6/2019 | Frei | |
| 10,342,721 | B2 | 7/2019 | Itano | |
| 10,363,179 | B2 | 7/2019 | Itano | |
| 10,413,460 | B2 | 9/2019 | Itano | |
| 10,426,677 | B2 | 10/2019 | Ferniany et al. | |
| 10,441,485 | B2 | 10/2019 | Lefkowicz | |
| 10,524,970 | B2 | 1/2020 | Dick et al. | |
| 10,548,785 | B2 | 2/2020 | Vermij et al. | |
| 10,624,803 | B2 | 4/2020 | Parker et al. | |
| 10,667,967 | B2 | 6/2020 | Horacek | |
| 10,667,968 | B2 | 6/2020 | Ueda et al. | |
| 10,667,969 | B2 | 6/2020 | Farricielli et al. | |
| 10,828,213 | B1 * | 11/2020 | Ludovici | A61G 5/1054 |
| 11,021,013 | B2 * | 6/2021 | Couture | B60B 33/0002 |
| 11,021,014 | B2 * | 6/2021 | Bleau | B60B 33/0002 |
| 11,096,846 | B2 * | 8/2021 | Bach Castillo | A61G 5/1083 |
| 11,173,081 | B2 * | 11/2021 | Mulhern | A47C 1/028 |
| 11,246,773 | B2 * | 2/2022 | Küschall | A61G 5/128 |
| 11,364,163 | B1 * | 6/2022 | Foonberg | A61G 5/0883 |
| 11,376,173 | B2 * | 7/2022 | Foonberg | A61G 5/0875 |
| 11,382,810 | B2 * | 7/2022 | Silveira | A61G 5/1067 |
| 11,607,355 | B2 * | 3/2023 | Traxinger | A61G 5/1062 |
| 11,712,382 | B2 * | 8/2023 | Kelly | A47C 1/025 280/657 |
| 11,813,210 | B1 * | 11/2023 | Foonberg | A61G 5/0816 |
| 2003/0230868 | A1 | 12/2003 | Beumer | |
| 2004/0021298 | A1 * | 2/2004 | Tsai | A61G 5/08 280/642 |
| 2005/0057021 | A1 * | 3/2005 | Miyoshi | A61G 5/00 280/250.1 |
| 2008/0238041 | A1 * | 10/2008 | Chen | A61G 5/125 280/650 |
| 2015/0137548 | A1 | 5/2015 | Purdue et al. | |
| 2015/0245963 | A1 | 9/2015 | Lauret et al. | |

* cited by examiner

FOLDABLE TILTABLE WHEELCHAIR AND FRAME THEREFOR

CROSS-REFERENCE TO RELATED APPLICATIONS

This application is a continuation of U.S. application Ser. No. 15/644,472, filed Jul. 7, 2017, the disclosure of which is incorporated herein by reference.

BACKGROUND

This invention relates in general to wheelchairs and more particularly to foldable tiltable wheelchairs, and frames therefor.

Tiltable wheelchairs are used in a wide range of mobility applications and while the state of the art in pediatric wheelchairs includes a range of foldable frame options, the adult wheelchair market generally allows only use of non-foldable rigid frames for increased weight capacities. Increased size of non-foldable frames reduces capability of transportation of wheelchairs in personal vehicles and public transportation, which can limit the suitability of use for many users. In addition, space needed for storage of a non-foldable wheelchair in the home or a long-term care facility can hinder suitability of use in areas with limited space, which is often the case in many healthcare facilities.

While many users would benefit from weight-shifting characteristics of a tiltable seat, a traditional cross-member of a foldable wheelchair with no seat tilt capability is often prescribed to meet the needs of transportation and storage. There is a need for a foldable tiltable frame for adult weight capacity wheelchairs that overcomes the foregoing deficiencies.

SUMMARY

A foldable tiltable wheelchair that overcomes the foregoing deficiencies comprises a base frame comprising laterally spaced side frames. A tiltable seat frame is supported for pivotal movement in relation to the base frame. The tiltable seat frame comprises laterally spaced seat rails. A first foldable cross-member provides a rigid connection between the seat rails when in an unfolded position.

According to one embodiment, a second foldable cross-member provides a rigid connection between the side frames when in an unfolded position. The first and second foldable cross-members coupled so that moving one cross-member moves the other cross-member.

According to another embodiment, the tiltable seat frame comprises a seat back supported in relation to the seat frame. The seat back comprises laterally spaced back canes. The first foldable cross-member is coupled to the seat frame so that the back canes are supported in relation to the first foldable cross-member so as to limit lateral flexure of the back canes. The first foldable cross-member is foldable to a folded position to fold the wheelchair.

Various advantages of this invention will become apparent to those skilled in the art from the following detailed description of the preferred embodiment, when read in light of the accompanying drawings.

DETAILED DESCRIPTION

Figure 1:
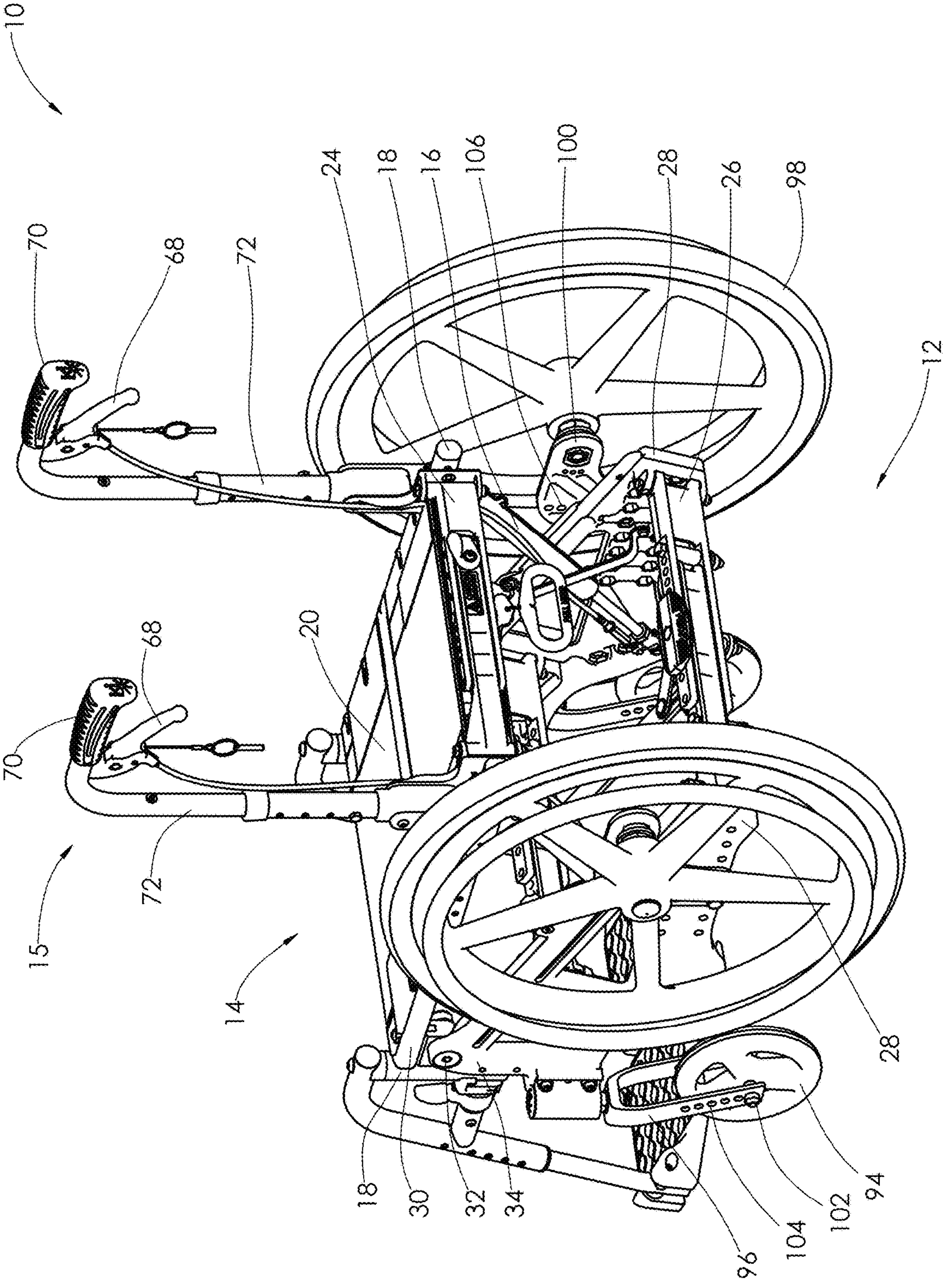
FIG. 1 is a rear perspective view of an exemplary foldable tiltable wheelchair.

Referring now to the drawings, there is illustrated in FIGS. 1-5 an exemplary wheelchair 10 configured with a foldable base frame 12 to support a tiltable seat frame 14. A seat back 15 is supported in relation to the seat frame 14. The seat back 15 comprises laterally spaced (i.e., in a side to side direction) back canes 72. A pair of locking gas springs 16 support the tiltable seat frame 14 in relation to the foldable base frame 12 to provide increased stability. It should be appreciated that the wheelchair has opposing sides with component parts or features on one side that may be the same or substantially the same as the other side. In some instances, the description refers to components parts or features on one side of the wheelchair. However, it should be clear that the components parts or features may be present on the other side as well.

The seat frame 14 comprises two longitudinally extending (i.e., in front to back direction), laterally spaced (i.e., in a side to side direction) seat rails 18. A seat sling 20 is connected to the seat rails 18. Foldable cross-members 22, 24, 26 (shown in FIGS. 3 and 5) are connected between laterally spaced (i.e., in a side to side direction) side frames 28. The foldable cross-members 22, 24, 26 provide a rigid connection between the side frames 28 when in an unfolded position. A front end 30 of each one of the seat rails 18 is pivotally connected to a respective or corresponding one of the side frames 28 at pivot points 32 near the front end 34 of the side frames 28 (shown in FIGS. 1 and 3). A rear end 36 (shown in FIG. 3) of the seat frame 14 is connected to the side frames 28 via the locking gas springs 16. The locking gas springs 16 permit adjustment of the angle of the seat frame 14, aid in tilting/recovering the user of the wheelchair 10 throughout a range of angles of the seat frame 14 and provide lateral support for incidental lateral loading.

The close proximity of the pivot points 32 near the front end 30 of each seat rail 18 to the front end 34 of respective side frames 28 results in minimal rise or increase in elevation of the user's knee level while tilting through the full range of angle adjustments of the seat frame 14. This allows for better maneuverability, particularly under tables and counters, and maintains ability for foot propulsion while the seat frame 14 is tilted.

Figure 2:
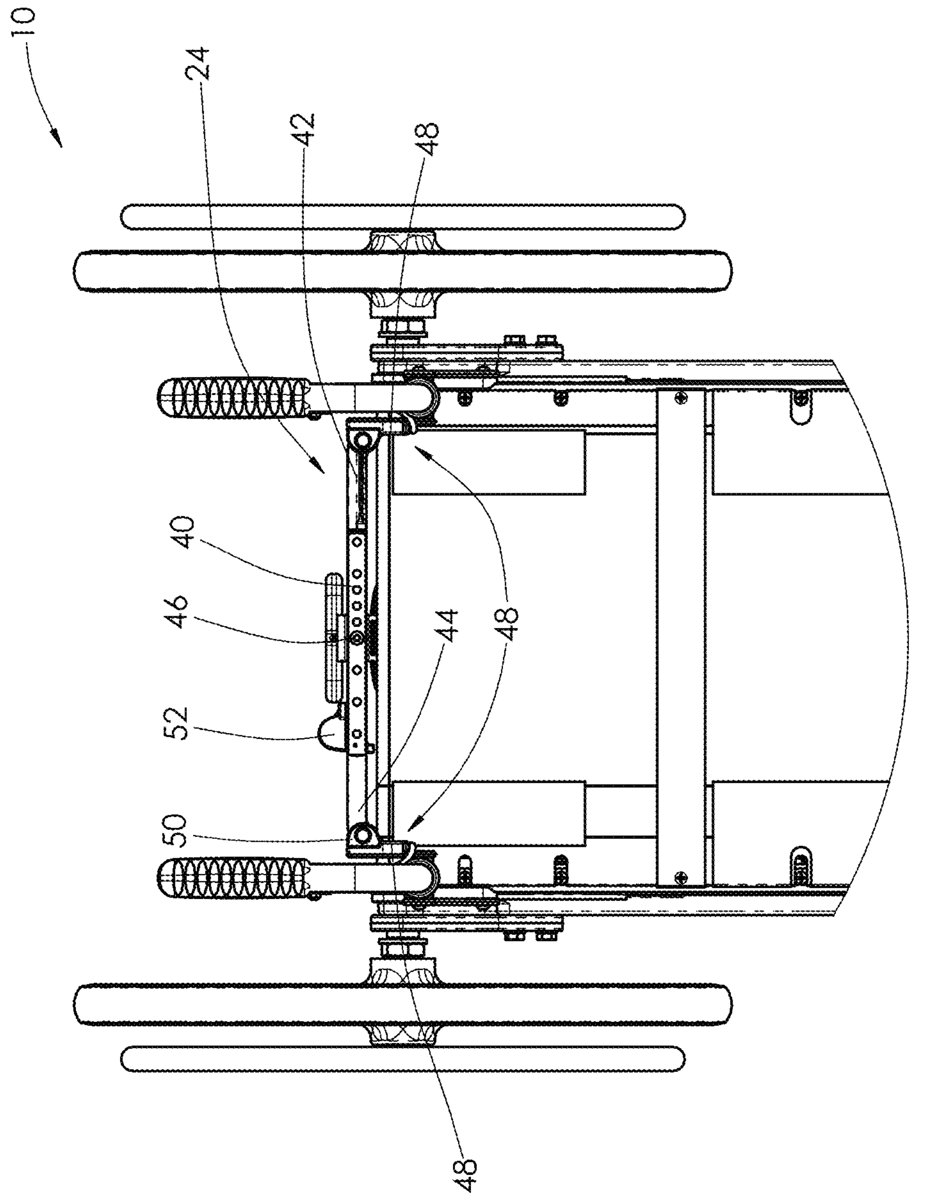
FIG. 2 is a partial top plan view of the foldable tiltable wheelchair shown in FIG. 1.

A rear foldable cross-member 24 may be coupled to the seat frame 14 to provide rigidity to the rear of the seat frame 14 to keep the seat rails 18 substantially square (i.e., prevent a lateral distance between a rear end 36 of the seat rails 18 from becoming significantly different than a lateral distance between the front end 30 of the seat rails 18). The rear foldable cross-member 24 also provides added rigidity to hold the two seat rails 18 in a substantially parallel relation to one another (i.e., from being at an excessively different in angle (e.g., vertical angle) from one another). The coupling of the rear foldable cross-member 24 to the seat frame 14 may also limit radial flexure of the seat rails 18 and/or lateral flexure or canting of the back canes 72 (e.g., deflection of the back canes 72 in relation to a vertical orientation), as will be clearly understood in the description below. As shown in FIG. 2, the rear foldable cross-member 24 has a plurality of holes 40 to allow the wheelchair 10 to be adjusted for various seat widths. This is accomplished by aligning different holes of a first portion 42 of the rear foldable cross-member 24 with holes of a second portion 44 of the rear foldable cross-member 24, and fastening the two portions 42, 44 together with a fastener 46, such as a pin or threaded fastener, at a sufficiently centralized location on the rear foldable cross-member 24 that the first and second portions 42, 44 of the rear foldable cross-member 24 pivot about the fastener 46 when folding the wheelchair 10. The first and second portions 42, 44 of the rear foldable cross-member 24 are connected to the seat frame 14 (e.g., via the seat rails 18) using mounting plates 48 with clevis tabs 50 of a clevis 51 to allow the first and second ends or portions 42, 44 of the rear foldable cross-member 24 to rotate or pivot in relation to the seat frame 14. More particularly, the clevis 51 may be supported in fixed relation to each seat rail 18 and the rear foldable cross-member 24 may be coupled for pivotal or rotational movement to the side rails 18 by the clevis 51. The clevis 51 may be in the form of a forked connector within which ends or portions 42, 44 of the rear foldable cross-member 24 are fastened for pivotal or rotational movement, for example, by a fastener 53 (e.g., a pin or threaded fastener) passing through ends (e.g., the clevis tabs 50) of the forked connector (e.g., the clevis 51)

The clevis 51 may form a part of a bracket 55 comprising a first member 59 extending forwardly in relation to the clevis 51. The first member 59 may be configured to be supported in fixed relation to the seat rails 18. A second member 59' may extend upwardly in relation to the clevis 51. The back canes 72 may be configured to be supported for pivotal movement in relation to the second member 59'. The first and second members 59, 59' may comprise substantially coplanar mounting surfaces for mounting to the seat rails 18 and the back canes 72. The first and second members 59, 59' may be substantially at a right angle in relation to one another. In other words, the first member 59 may extend along a first axis X and the second member 59' may extend along a second axis Y, wherein the first and second axes X, Y may be substantially at a right angle in relation to one another. Moreover, the ends (i.e., the clevis tabs 50) of the forked connector (e.g., the clevis 51) may extend inwardly of the seat rails 18 along a third axis Z, wherein the first, second and third axes X, Y, Z may be substantially at a right angle in relation to one another. In broader terms, it should be understood that the seat rails 18, and/or the back canes 72, and the rear foldable cross-member 24 may be triangulated to form a rigid box-like structure (e.g., a structure resembling a box in rectangularity or box-shaped) between the seat rails 18, and/or the back canes 72, and the rear foldable cross-member 24 to limit lateral deflection of the back canes 72 from for a vertical orientation.

The rear foldable cross-member 24 may be held in the unfolded position by having the first and second portions 42, 44 of the rear foldable cross-member 24 over center, by a mechanical lock 52, or both.

Figure 3:
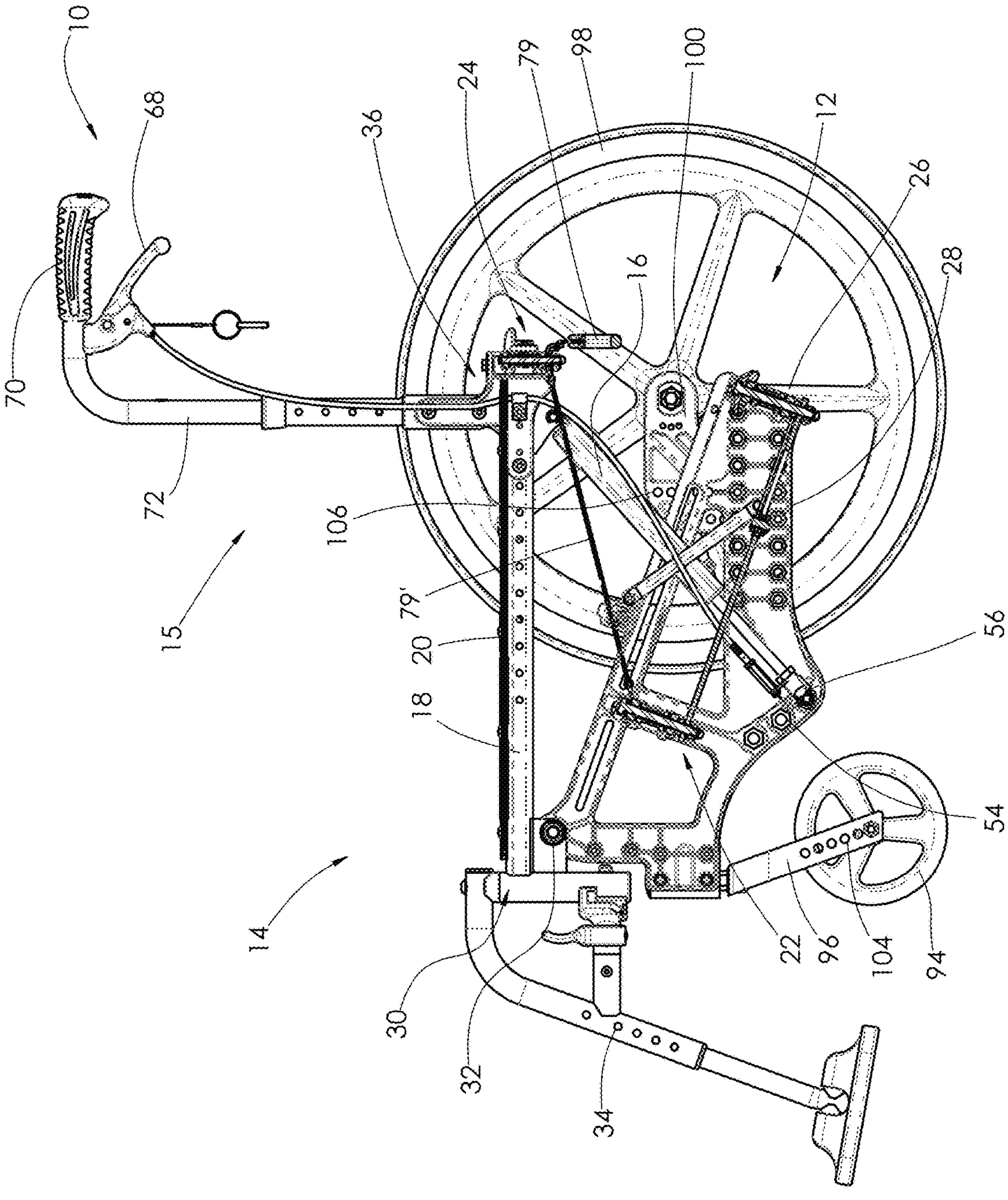
FIG. 3 is a sectional view of the foldable tiltable wheelchair shown in FIG. 1.
Figure 4:
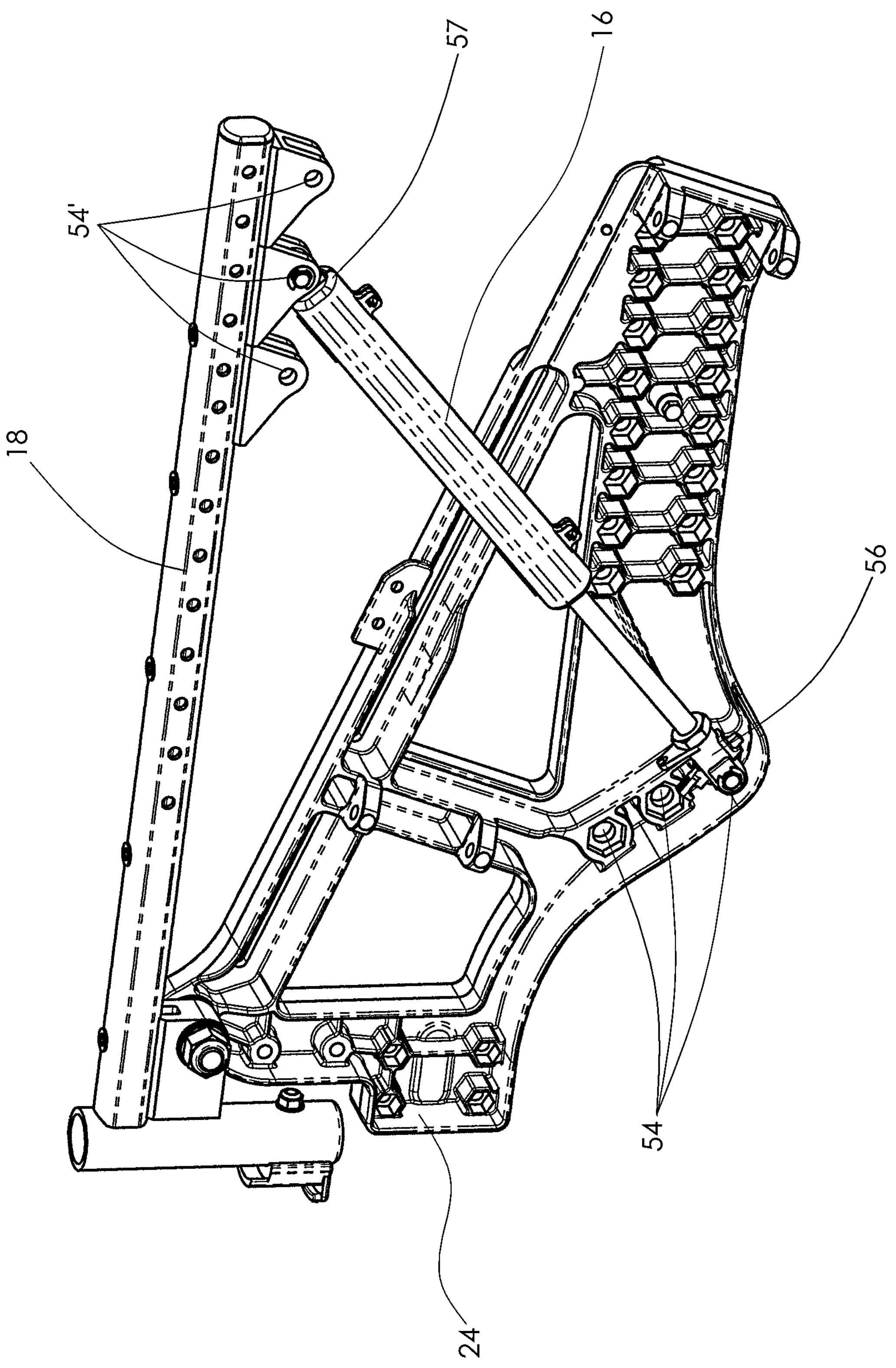
FIG. 4 is an enlarged partial side view of the foldable tiltable wheelchair shown in FIG. 1, showing adjustment holes for a locking gas spring supported in relation to a side frame and seat rail of the wheelchair.

The locking gas springs 16 may provide vertical support to the seat frame 14 and provide angular adjustment of the seat frame 14. As shown in FIG. 3, a plurality of adjustment holes 54 may be supported in relation to the side frame 28 for the attachment of a lower end 56 of the locking gas springs 16. The amount of rotational force that the locking gas springs 16 apply to the seat rails 18 can be adjusted by altering the lower attachment point of the locking gas spring 16 on the side frames 28, which changes the between of the locking gas spring 16 and the seat rail 18, which, in turn, alters the amount of mechanical advantage the locking gas spring 16 has when applying force to the seat rails 18. This allows the tilting/recovering force to be fine-tuned, to optimize force for occupants of different weights. It should be understood that a plurality of adjustment holes 54' may be supported in relation to the seat rail 18 for attachment of the upper end 57 of the locking gas springs 16, or holes 54, 54' may be supported in relation to the side frame 28 and the seat rail 18 for attachment of both ends 56, 57 of the locking gas springs 16, as shown in FIG. 4.

Figure 5:
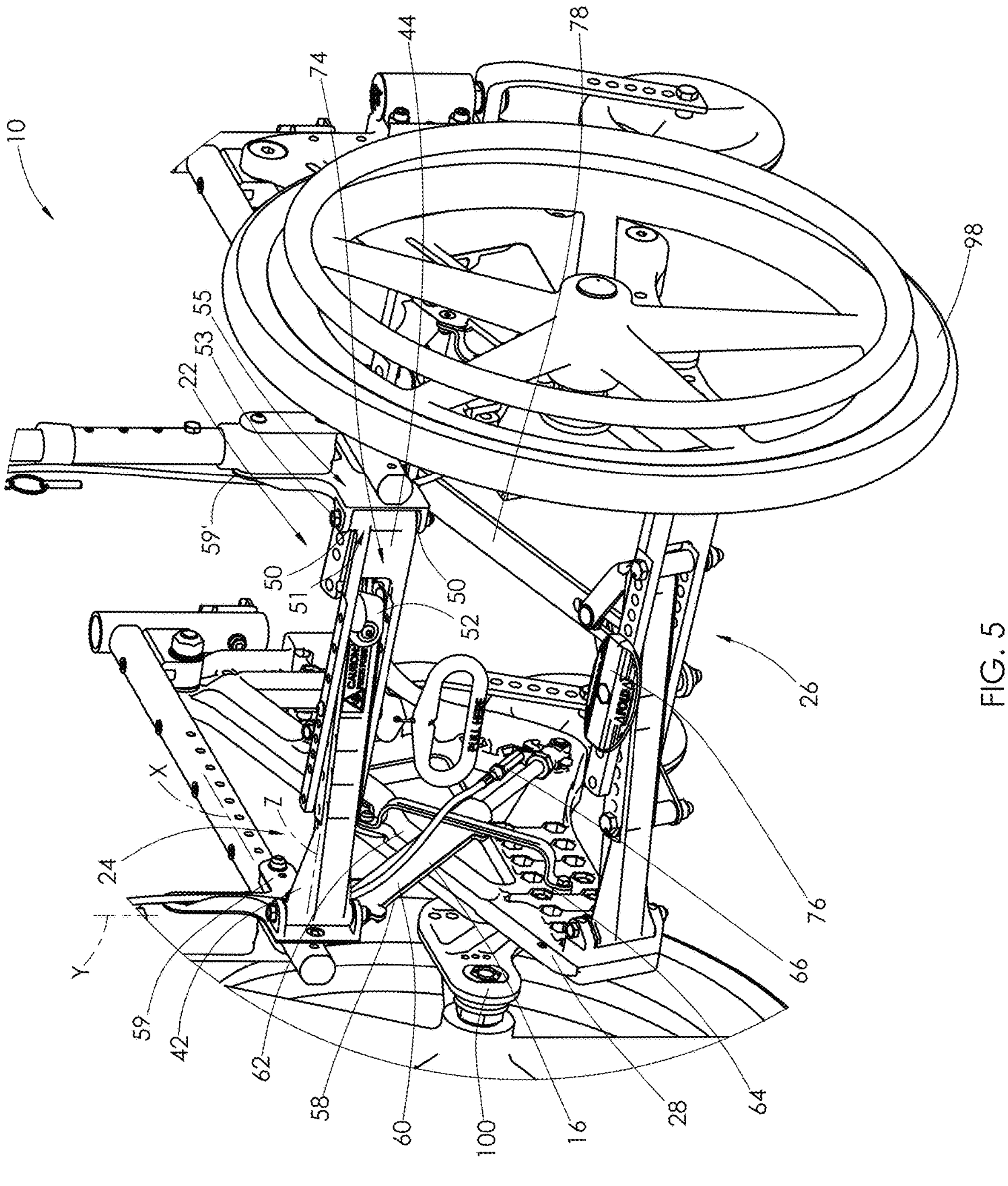
FIG. 5 is an enlarged partial rear perspective view of the foldable tiltable wheelchair shown in FIG. 1, showing more clearly foldable cross-members.

The locking gas springs 16 may also provide lateral rigidity of the seat frame 14 relative to the side frames 28 by using an outer surface 58 of a body or cover 60 of the locking gas spring 16 as a first guide surface, as shown in FIG. 5, to minimize lateral motion when subjected to incidental lateral forces. The locking gas springs 16 are in close proximity to a second guide surface 62 that is in a fixed lateral position relative to the side frames 28 to permit minimal lateral motion of the locking gas springs 16. Additionally, a capturing bracket 64 on the opposite side of the locking gas spring 16 may be used for an additional support/constraint for the locking gas springs 16. Exemplary capturing brackets 64 may be in the form of C-shaped brackets having opposing ends connected to respective side frames 14. The locking gas springs 16 may be captured in a space bounded by the C-shaped brackets, while the locking gas springs 16 can travel in the space as the locking gas springs 16 move to raise and lower the seat frame 14.

It should be appreciated that the locking gas springs 16 may be controlled in any suitable manner. For example, the locking gas springs 16 may be actuated by cables 66 (shown in FIG. 5), which may be controlled by triggers 68 positioned adjacent to handles 70 atop the seat back canes 72 of the wheelchair 10 (shown in FIG. 1), to allow an attendant to easily control the tilting of the seat frame 14. Controlling the locking gas springs 16 in this manner is well known to those of ordinary skill in the art.

The foldable cross-members 22, 24, 26 are more clearly shown in FIG. 5. In FIG. 1, the foldable cross-members 22, 24, 26 are shown in an unfolded position. The rear foldable cross-member 24 may be held in the unfolded position by the rotatable mechanical lock 52. With the rear foldable cross-member 24 held in the unfolded position, the remaining foldable cross-members 22, 26 will likewise be held in the unfolded position. To fold the wheelchair 10, the mechanical lock 52 can be rotated (i.e., in a clockwise direction when viewing FIG. 5) to clear an opening 74 in the second portion 44 of the rear foldable cross-member 24. This allows an end of the first portion 42 of the rear foldable cross-member 24 to pass through the opening 74. Simultaneously, all three foldable cross-members 22, 24, 26 (i.e., front, rear and lower foldable cross-members) will fold (i.e., in a forward direction when viewing FIG. 5). To aid in folding the wheelchair 10, a foot plate 76 is provided, which when pushed by an attendant (i.e., in a forward direction when viewing FIG. 5), urges the lower foldable cross-member 26 in a folded position. The foldable cross-members 22, 24, 26 may be coupled so that moving one of the foldable cross-members 24, 24, 26 to a folded position may move another one of the foldable cross-members 22, 24, 26 to a folded position to fold the wheelchair 10. For example, a lower link 78 may be provided for connecting the lower foldable cross-member 26 to the front foldable cross-member 22 so that the front and lower foldable cross-member 22 may be simultaneously urged to a folded position. The rear foldable cross-member 24 may follow by virtue of a link 79' connecting the front foldable cross-member 22 to the rear foldable cross-member 24, or supported in relation to the front and rear cross-members 22, 24. To unfold the wheelchair 10, the foldable cross-members 22, 24, 26 are unfolded (e.g., in a rear direction when viewing FIG. 5) until the end of the first portion 42 of the rear foldable cross-member 24 passes through the opening 74 in the second portion 44. To aid in unfolding the wheelchair 10, a handle 79 may be provided and the upper link 79' may be connected to the handle 79. Pulling the handle 79 rearwardly (i.e., to the right when viewing FIG. 3) may pull the upper link 79' rearwardly. This, in turn, may pull the front and rear foldable cross-members 22, 24 rearwardly to an unfolded position. The lower foldable cross-member 26 may be urged rearwardly by the lower link 78. The rear foldable cross-member 24 may be held in the unfolded position by rotating the rotatable mechanical lock 52 (i.e., in a counter-clockwise direction when viewing FIG. 5) to a locked position.

Figure 6:
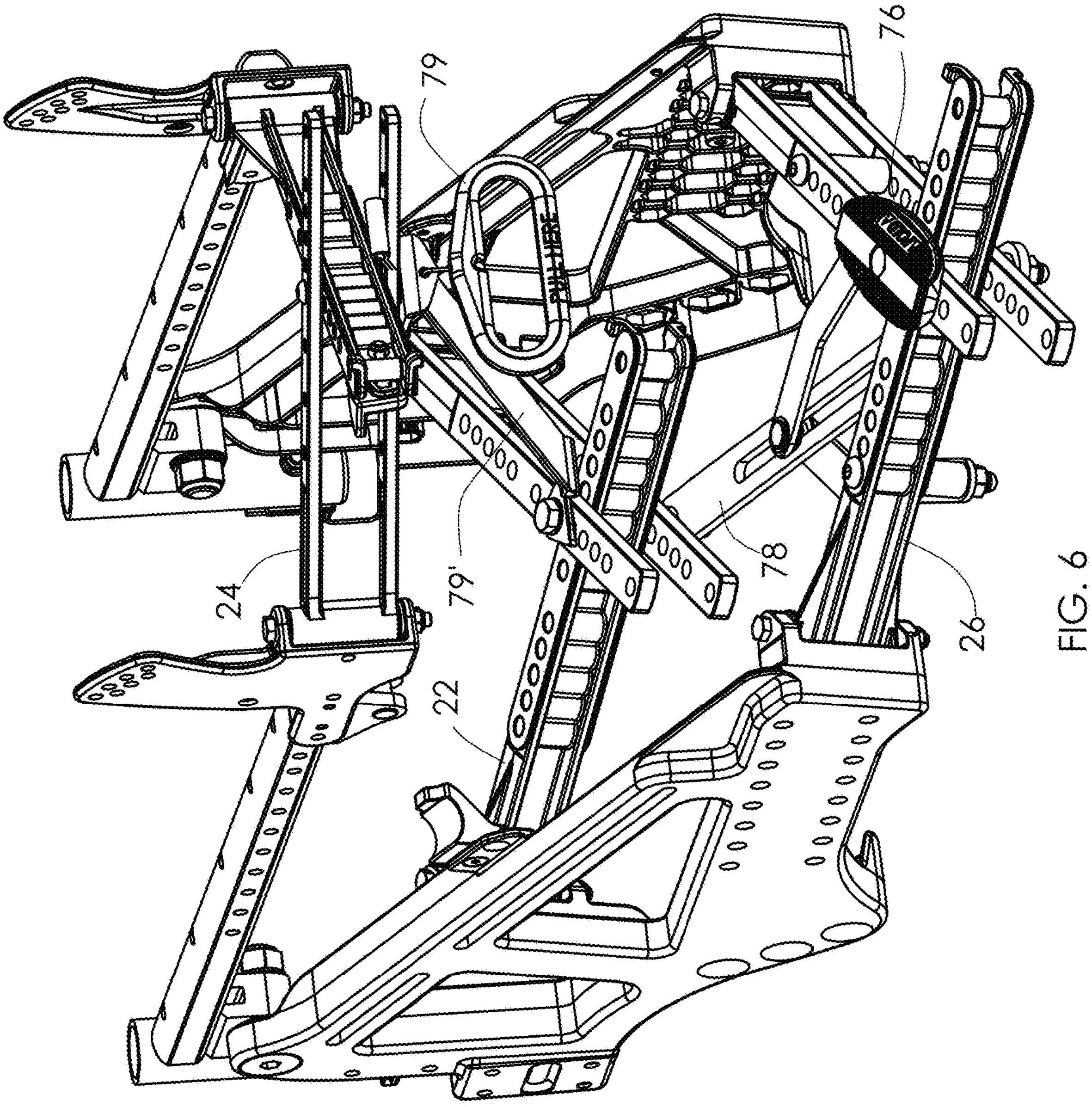
FIG. 6 is an enlarged partial rear perspective view of an exemplary foldable tiltable wheelchair, showing foldable cross-members that fold in an alternative direction.

As clearly shown in FIG. 6, the handle 79 may be configured to be pulled rearwardly (i.e., to the right when viewing FIG. 6) to pull the upper link 79' rearwardly. This, in turn, may pull the front and rear foldable cross-members 22, 24 rearwardly to a folded position. The lower foldable cross-member 26 may be urged rearwardly by the lower link 78 to a folded position, to fold the wheelchair 10. To unfold the wheelchair 10, the foot plate 76 may be pushed by an attendant (i.e., in a into the page when viewing FIG. 6) to urge the lower foldable cross-member 26 to an unfolded position. The rear foldable cross-member 24 may follow by virtue of the link 79' connecting the front foldable cross-member 22 to the rear foldable cross-member 24.

It should be appreciated that the links 78, 79' may be rigid links, or resilient or pliable links. Moreover, the links 78, 79' may be adjustable. For example, the upper link 79' may be a pliable strap, formed from or supporting a fastening structure, such as a hook and loop type fastening structure. Such a structure is distributed under the name VELCRO, which is a registered trademark of Velcro Industries B.V., private limited liability company of the Netherlands, Castorweg 22-24 Curacao. A portion of the strap may pass through the front foldable cross-member 22 and attach to itself. The strap (i.e., the upper link 79') may be adjustable to accommodate adjustments in distance between the front and rear cross-members 22, 24 to, in turn, accommodate adjustments in the depth of the seat 20, which is accommodated by adjusting a front end or portion of the seat rails 18 in relation to the rear end or portion of the seat rails 18.

Figure 7:
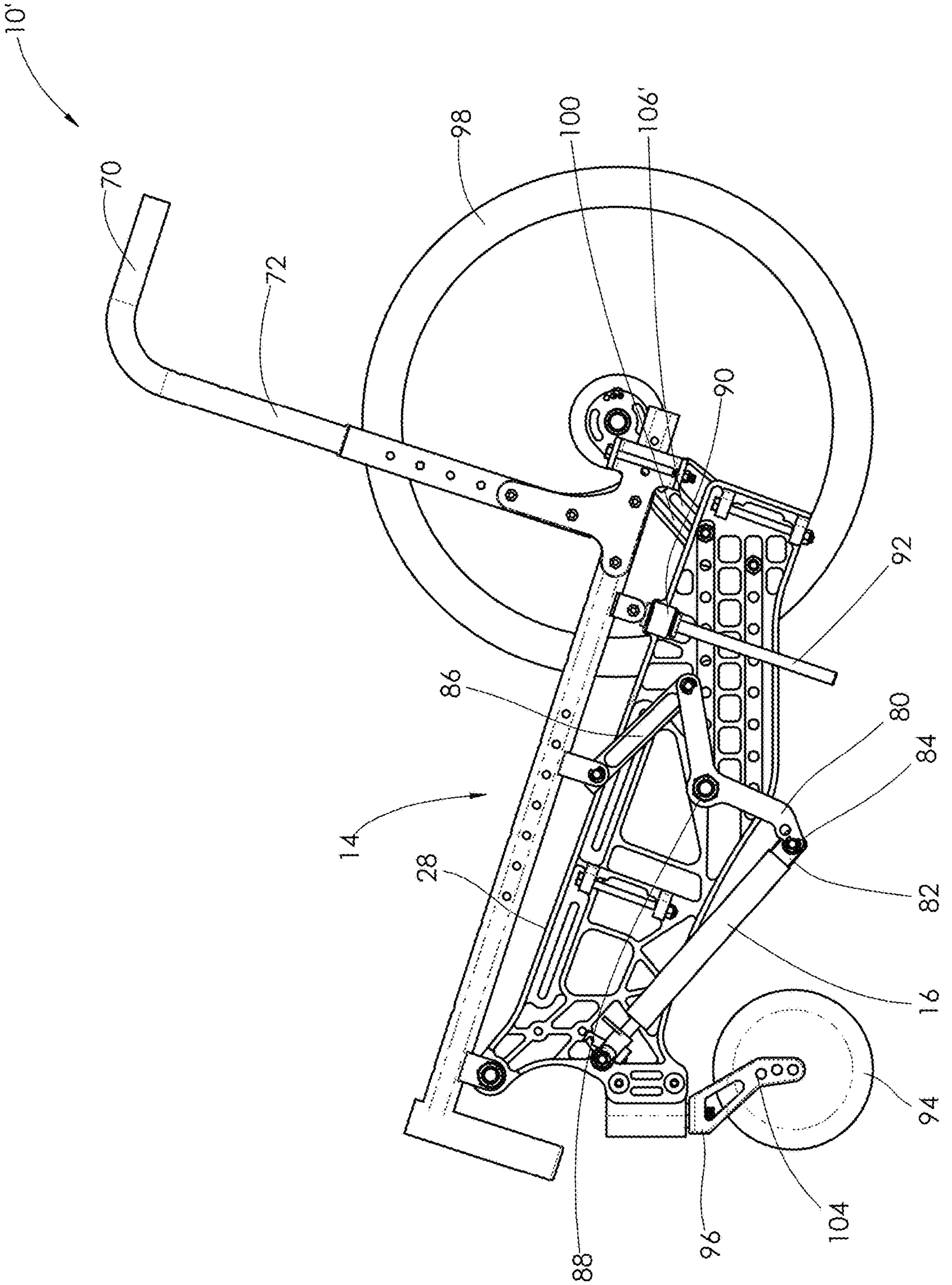
FIG. 7 is a partial side elevational view of an exemplary foldable tiltable wheelchair with portions of the wheelchair removed to show alternative seat frame tilt and lateral stability configurations.
Figure 8:
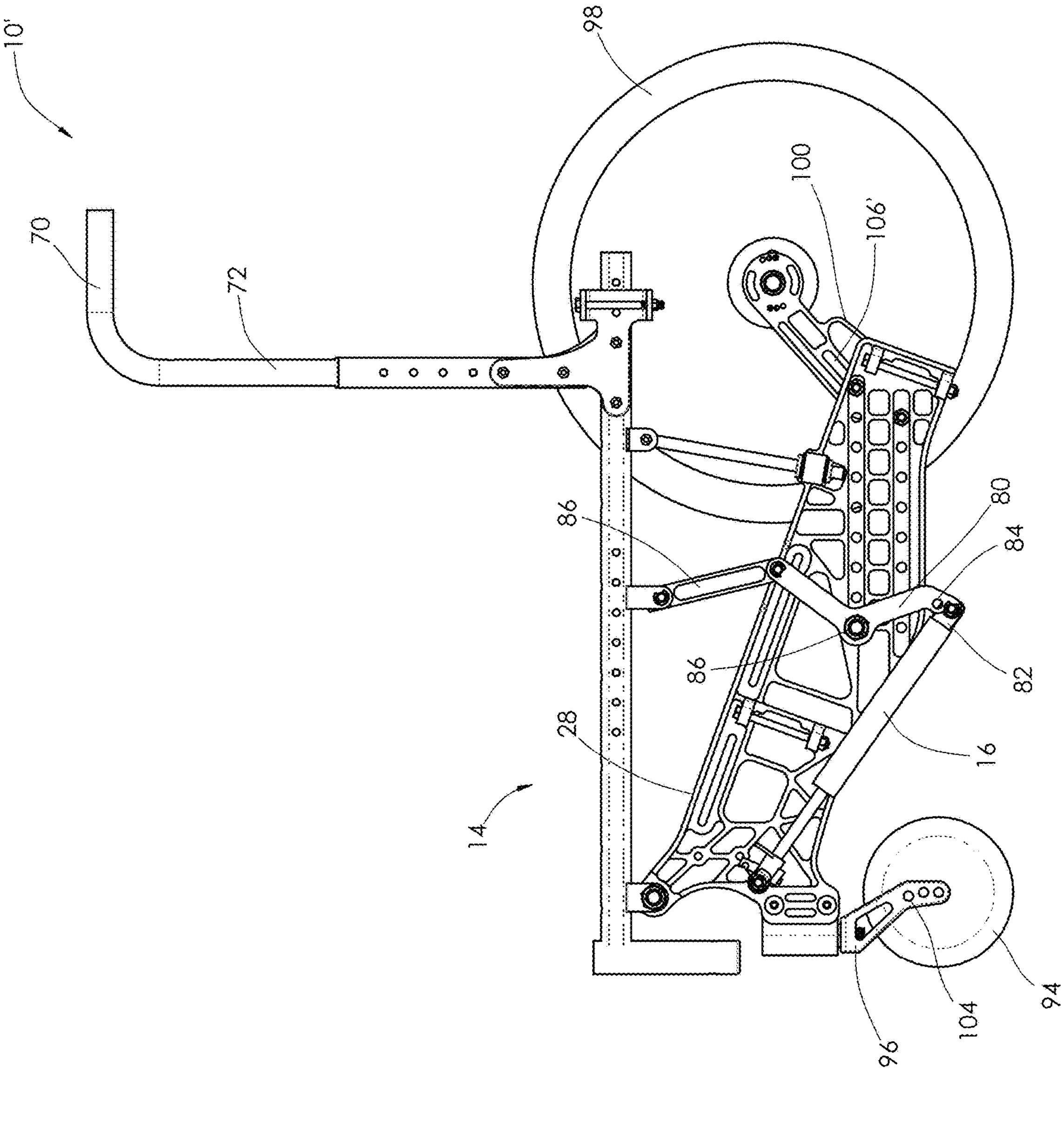
FIG. 8 is a side elevational view of the wheelchair shown in FIG. 7 with a seat frame thereof in a raised position.

An exemplary wheelchair 10' with an alternative seat frame tilt configuration is shown in FIG. 7. The tilt configuration comprises a linkage arrangement comprising a fulcrum 80 connected to a first end 82 of the locking gas spring 16. The fulcrum 80 may be positioned at one of a plurality of leverage points 84 to adjust lifting force of the locking gas spring 16 to accommodate different user weights. Although two leverage points 84 are shown in the drawing, additional leverage points may be provided. The fulcrum 80 may be connected to the seat frame 14 by a linkage 86. In FIG. 7, the locking gas spring 16 is completely retracted, the seat frame 14 is reclined about 20 degrees. As the locking gas spring 16 extends, the fulcrum 80 pivots about a medially positioned pivot 88 (i.e., in a counter-clockwise direction when viewing FIG. 8) to drive the linkage 86 to raise the seat frame 14 (e.g., to a neutral position), as shown in FIG. 8. As stated above, the locking gas springs 16 may be actuated by cables controlled by triggers mounted adjacent to handles 70 atop seat back canes 72, allowing an attendant to easily control the tilting of the seat frame 14.

As shown in the drawings, lateral stability of the seat frame 14 may alternatively be controlled by linear support bearings 90 and rods 92 connecting opposing sides of the seat frame 14 to respective side frames 28. The linear support bearings 90 are connected to the side frames 28 and the rods 92 are pivotally connected to respective seat frame tubes 18. The rods 92 translate through the linear support bearings 90 to provide lateral support to side loads while allowing tiling operation of the wheelchair 10 throughout the range of tilt of the seat frame 14.

The front end of the wheelchair 10, 10' is supported in relation to a supporting surface by caster wheels 94 supported by caster forks 96 that swivel in relation to the front end of the base frame 12 so as to be steerable in relation to the base frame 12, and thus permit the wheelchair 10, 10' to be steered. The rear end of the wheelchair 10, 10' is supported in relation to the supporting surface by drive wheels 98 supported by mounting brackets 100 that are supported in relation to the rear end of the base frame 12, whereby rotation of the drive wheels 98 propels the wheelchair 10, 10' along the supporting surface.

It should be appreciated that the caster wheels 94 may be adjusted in relation to the caster forks 96 (i.e., in a vertical direction when viewing the drawings), for example, via a fastener 102 (shown in FIG. 1) that cooperates with any one of a plurality of adjustment holes 104 in the caster forks 96 to adjust the height of the front end of the base frame 12, and thus, the front end 30 of the seat rails 18, in relation to the supporting surface. The drive wheels 98 likewise may be adjusted in relation to the rear end of the base frame 12, for example, via adjustment holes or a slot 106, 106' in the mounting bracket 100 to adjust the height of the rear end of the base frame 12 in relation to the supporting surface. Wheel adjustment permits the seat frame height to be adjusted to accommodate various users.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

PARTS LIST

10 wheelchair
10' wheelchair
12 foldable base frame
14 tiltable seat frame
15 seat back
16 locking gas springs
18 longitudinal seat rails
20 seat sling
22 foldable cross-member
24 foldable cross-member

26 foldable cross-member
28 side frames
30 front end
32 pivot points
34 front end
36 rear end
40 plurality of holes
42 first portion of rear foldable cross-member
44 second portion of rear foldable cross-member
46 fastener
48 mounting plates
50 clevis tabs
51 clevis
52 mechanical lock
53 fastener
54 adjustment holes
54' adjustment holes
55 bracket
56 end of locking gas springs
57 upper end of locking gas springs
58 outer surface
59 first member
59' second member
60 body or cover
62 second guide surface
64 capturing bracket
66 cables
68 triggers
70 handles
72 back canes
74 opening
76 foot plate
78 lower link
79 handle
79' upper link
80 fulcrum
82 first end of locking gas springs
84 plurality of leverage points
86 linkage
88 medially positioned pivot
90 linear support bearings
92 rods
94 caster wheels
96 caster forks
98 drive wheels
100 mounting brackets
102 fastener
104 adjustment holes
106 adjustment holes or slot
106' adjustment holes or slot
X first axis
Y second axis
Z third axis

What is claimed is:

1. A foldable tiltable wheelchair comprising:

a base frame comprising laterally spaced side frames;

a tiltable seat frame supported for pivotal movement in relation to the base frame, the tiltable seat frame comprising laterally spaced seat rails;

a first foldable cross-member forming a connection between the side frames and providing a rigid connection between the side frames when in an unfolded position, a second foldable cross-member forming a connection between the seal rails and foldable within a plane coplanar with a plane bounded between the seat rails and providing a rigid connection between the seat rails when in an unfolded position, wherein the first foldable cross-member is coupled to the second foldable cross-member so that moving one of the first or second foldable cross-members moves the other one of the first or second foldable cross-members.

2. The wheelchair of claim 1, wherein the first foldable cross-member is coupled to the second foldable cross-member by a first link supported in relation to the first and second foldable cross-members, the first link being operable to be moved to move one of the first or second cross-members in response to movement of the other one of the first or second cross-members.

3. The wheelchair of claim 2, wherein the link is operable to be moved to move one of the first or second cross-members to an unfolded position in response to movement of the other one of the first or second cross-members to an unfolded position.

4. The wheelchair of claim 2, wherein the link is operable to be moved to move one of the first or second cross-members to a folded position in response to movement of the other one of the first or second cross-members to a folded position.

5. The wheelchair of claim 2, further comprising a handle connected to the first link, the handle being operable to move at least one of the first link or one of the first and second cross-members, which in turn moves the first link.

6. The wheelchair of claim 2, further comprising:

a third foldable cross-member spaced aft of the first foldable cross-member and further providing a rigid connection between the side frames when in an unfolded position, and a second link connecting the first foldable cross-member to the third foldable cross-member, wherein moving one of the first or third foldable cross-members moves the other one of the first or third foldable cross-members.

7. The wheelchair of claim 6, further comprising a foot plate rearward of the third foldable cross-member and pushable to urge the third foldable cross-member in a folded position.

8. The wheelchair of claim 2, wherein the first link is adjustable.

9. The wheelchair of claim 2, wherein the first link is adjustable to accommodate adjustments in distance between the first foldable cross-member and the second foldable cross-member.

10. The wheelchair of claim 9, wherein the first link is a pliable strap.

11. The wheelchair of claim 10, wherein the pliable strap is formed from or supporting a fastening structure.

12. The wheelchair of claim 11, wherein the fastening structure is a hook and loop type fastening structure.

13. The wheelchair of claim 10, wherein a portion of the pliable strap passes through the first foldable cross-member and attaches in relation to another portion of the pliable strap.

14. The wheelchair of claim 2, wherein the seat frame is adjustable and the first link is adjustable to accommodate adjustments in the seat frame.

15. A foldable tiltable wheelchair comprising:

a base frame comprising laterally spaced side frames;

a tiltable seat frame supported for pivotal movement in relation to the base frame, the tiltable seat frame comprising laterally spaced seat rails;

a seat back supported in relation to the seat frame, the seat back comprising laterally spaced back canes;

a first foldable cross-member forming a connection between the seat rails and foldable within a plane coplanar with a plane bounded between the seat rails and providing a rigid connection between the seat rails when in an unfolded position, wherein the first foldable cross-member is coupled to the seat frame, the back canes being coupled to the first foldable cross-member so the first foldable cross-member limits lateral flexure of the back canes, and wherein the first foldable cross-member is foldable to a folded position to fold the wheelchair.

16. The wheelchair of claim 15, further comprising a clevis supported in fixed relation to each seat rail, the first foldable cross-member being coupled for pivotal movement to the seat frame by the clevis.

17. The wheelchair of claim 16, wherein the clevis comprises a forked connector within which ends of the first foldable cross-member are fastened for pivotal movement by a fastener passing through ends of the connector.

18. A foldable tiltable wheelchair comprising:

a base frame comprising laterally spaced side frames;

a tiltable seat frame supported for pivotal movement in relation to the base frame, the tiltable seat frame comprising laterally spaced seat rails;

a seat back supported in relation to the seat frame, the seat back comprising laterally spaced back canes;

a first foldable cross-member providing a rigid connection between the seat rails when in an unfolded position and folds in a plane defined between the seat rails, wherein the first foldable cross-member is coupled to the seat frame, the back canes being coupled to the first foldable cross-member so the first foldable cross-member limit lateral flexure of the back canes, and wherein the first foldable cross-member is foldable to a folded position to fold the wheelchair, a clevis supported in fixed relation to each seat rail, the first foldable cross-member being coupled for pivotal movement to the seat frame by the clevis, wherein the clevis forms a part of a bracket comprising:

a first member extending in a first direction in relation to the clevis, the first member being supportable in fixed relation to the seat rails; and a second member extending in a second direction in relation to the clevis, the back canes being supportable for pivotal movement in relation to the second member.

19. The wheelchair of claim 18, wherein the first and second members comprise coplanar mounting surfaces.

20. The wheelchair of claim 18, wherein the first and second members are at a right angle in relation to one another.

21. The wheelchair of claim 18, wherein the first member extends along a first axis, the second member extends along a second axis, and the clevis comprises a forked connector that extends inwardly of the seat rails along a third axis, and wherein the first, second and third axes are substantially at a right angle in relation to one another.

22. The wheelchair of claim 15, wherein the back canes and the first foldable cross-member are arranged to form a rigid box-like structure resembling a box in rectangularity between the seat rails and the first foldable cross-member to limit lateral deflection of the back canes from a vertical orientation.

23. The wheelchair of claim 15, the first foldable cross-member is adjustable forwardly and rearwardly in relation to the seat rails to affect seat depth adjustment.

24. The wheelchair of claim 15, wherein the first foldable cross-member is width adjustable.

25. The wheelchair of claim 15, wherein a second foldable cross-member provides a rigid connection between the side frames when in an unfolded position.

* * * * *